(12) United States Patent
Xiang

(10) Patent No.: US 7,747,252 B2
(45) Date of Patent: Jun. 29, 2010

(54) METHOD AND SYSTEM FOR HANDOVER NEGOTIATION OPTIMIZATION FOR WIRELESS SYSTEM

(75) Inventor: Zhixian Xiang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1091 days.

(21) Appl. No.: 11/418,942

(22) Filed: May 4, 2006

(65) Prior Publication Data

US 2007/0015510 A1 Jan. 18, 2007

Related U.S. Application Data

(60) Provisional application No. 60/698,692, filed on Jul. 12, 2005.

(51) Int. Cl.
*H04W 36/00* (2009.01)
(52) U.S. Cl. .................. 455/436; 455/437; 455/438
(58) Field of Classification Search .............. 455/438
See application file for complete search history.

(56) References Cited

U.S. PATENT DOCUMENTS 6,449,482 B1 * 9/2002 Johansson et al. ........... 455/443
7,369,856 B2 * 5/2008 Ovadia ..................... 455/439
2002/0164985 A1 * 11/2002 Saada et al. ................ 455/436
2005/0250498 A1 * 11/2005 Lim et al. .................. 455/436
2005/0272481 A1 * 12/2005 Kim .......................... 455/574

* cited by examiner

*Primary Examiner*—Rafael Pérez-Gutiérrez
*Assistant Examiner*—German Viana Di Prisco
(74) *Attorney, Agent, or Firm*—Slater & Matsil, L.L.P.

(57) ABSTRACT

A method and system for processing a handover request in a wireless network. The method includes sending a first message by a first base station to a mobile station. The first message includes a first handover request. Additionally, the method includes receiving a second message by the first base station from the mobile station. The second message includes a second handover request, and the second handover request includes an indicator indicating whether the second message has been sent from the mobile station in response to a third handover request. Moreover, the method includes processing information associated with the second message by the first base station, and determining whether the second message has been sent from the mobile station in response to the third handover request based on at least information associated with the second message.

24 Claims, 16 Drawing Sheets

1300

| Syntax | Size | Notes |
|---|---|---|
| Management Message Type | 8 bit | - |
| MS HO req operation | 1 bit | 0: Independent HO request from MS. <br> 1: Response to MOB_BSHO-REQ with MS's own prefer HO configuration. |
| Report metric | 8 bit | Bitmap indicating presence of metric in message <br> Bit #0: BS CINR mean <br> Bit #1: BS RSSI mean <br> Bit #2: Relative delay <br> Bit #3: BS RTD; this metric shall be only measured on serving BS/anchor BS. <br> Bits #4–7: *Reserved*; shall be set to zero. |
| N_New_BS_Index | 8 bit | Number of new recommended BSs which are included in MOB_NBR-ADV message. |
| If(N_New_BS_Index!=0){ | | |
| Configuration change count for MOB_NBRADV | 8 bit | Configuration Change Count value of referring MOB_NBR-ADV message. |
| } | | |
| For(j=0;j< N_New_BS_Index;j++){ | | |
| Neighbor_BS_Index | 8 bit | |
| ..... | | |

| Syntax | Size (bits) | Notes |
|---|---|---|
| MOB_BSHO-REQ_Message_Format() { | — | — |
| Management Message Type = 56 | 8 | — |
| Network Assisted HO supported | 1 | Indicates that the BS supports Network Assisted HO |
| Mode | 3 | 0b000: HO request<br>0b001: SHO/FBSS request: Anchor BS update with CID update<br>0b010: SHO/FBSS request: Anchor BS update without CID update<br>0b011: SHO/FBSS request: Active Set update with CID update<br>0b100: SHO/FBSS request: Active Set update without CID update<br>0b101: SHO/FBSS request: Active Set update with CID update for newly added BS<br>0b110: SHO/FBSS request: Active Set update with CID update and CQICH allocation for newly added BS<br>0b111: reserved |
| Padding | 4 | Shall be set to zero. |
| If (Mode == 0b000) { | — | — |
| N_Recommended | 8 | — |
| Resource Retain Type | 1 | 0: MS resource release<br>1: MS resource retain |
| Padding | 7 | Shall be set to zero. |
| for (j=0 ; j<N_Recommended ; j++) { | — | N_Recommended can be derived from the known length of the message |
| Neighbor BSID | 48 | — |
| Service level prediction | 8 | — |
| Preamble index/Subchannel Index | 8 | |
| HO process optimization | 8 | |
| Network Assisted HO supported | 1 | Indicates that the BS supports Network Assisted HO |
| HO_ID_included_indicator | 1 bit | To indicate if the field HO_IND is included |
| If (HO_ID_included_indicator == 1) { | — | — |
| HO_ID | 8 | ID assigned for use in initial ranging to the target BS once this BS is selected as the target BS (see 6.3.20.5) |
| } | — | — |
| HO_authorization policy indicator | 1 | To indicate if authorization negotiation is used in HO procedure.<br>0: EAP authorization and the value of the MAC mode field in the current BS (default)<br>1: The authorization policy for the target BS is negotiated. |
| If (HO_authorization policy indicator == 1) { | — | — |

Figure 5

| Syntax | Size (bits) | Notes |
|---|---|---|
| MOB_BSHO-RSP_Message_Format() { | — | — |
| Management Message Type = 58 | 8 | — |
| Mode | 3 | 0b000: HO request<br>0b001: SHO/FBSS request: Anchor BS update with CID update<br>0b010: SHO/FBSS request: Anchor BS update without CID update<br>0b011: SHO/FBSS request: Active Set update with CID update<br>0b100: SHO/FBSS request: Active Set update without CID update<br>0b101: SHO/FBSS request: Active Set update with CID update for newly added BS<br>0b110: : SHO/FBSS request: Active Set update with CID update and CQICH allocation for newly added BS<br>0b111: reserved |
| Reserved | 5 | Shall be set to zero. |
| If (Mode == 0b000) { | — | — |
| N_Recommended | 8 | — |
| For (j=0 ; j<N_Recommended ; j++) { | — | Neighbor base stations shall be presented in an order such that the first presented is the one most recommended and the last presented is the least recommended. |
| Neighbor BSID | 48 | — |

| Syntax | Size | Notes |
|---|---|---|
| Management Message Type | 8 bit | - |
| MS HO req operation | 1 bit | 0: Independent HO request from MS.<br>1: Response to MOB_BSHO-REQ with MS's own prefer HO configuration. |
| Report metric | 8 bit | Bitmap indicating presence of metric in message<br>Bit #0: BS CINR mean<br>Bit #1: BS RSSI mean<br>Bit #2: Relative delay<br>Bit #3: BS RTD; this metric shall be only measured on serving BS/anchor BS.<br>Bits #4–7: Reserved; shall be set to zero. |
| N_New_BS_Index | 8 bit | Number of new recommended BSs which are included in MOB_NBR-ADV message. |
| If(N_New_BS_Index!=0){ | | |
| Configuration change count for MOB_NBRADV | 8 bit | Configuration Change Count value of referring MOB_NBR-ADV message. |
| } | | |
| For(j=0;j< N_New_BS_Index;j++){ | | |
| Neighbor_BS_Index | 8 bit | |
| ..... | | |

| Syntax | Size | Notes |
|---|---|---|
| Management Message Type | 8 bit | |
| MS HO req operation | 1 bit | 0: Independent HO request from MS.<br>1: Response to MOB_BSHO-RSP with MS's own prefer HO configuration. |
| Report metric | 8 bit | Bitmap indicating presence of metric in message<br>Bit #0: BS CINR mean<br>Bit #1: BS RSSI mean<br>Bit #2: Relative delay<br>Bit #3: BS RTD; this metric shall be only measured on serving BS/anchor BS.<br>Bits #4–7: *Reserved;* shall be set to zero. |
| N_New_BS_Index | 8 bit | Number of new recommended BSs which are included in MOB_NBR-ADV message. |
| If(N_New_BS_Index!=0){ | | |
| Configuration change count for MOB_NBRADV | 8 bit | Configuration Change Count value of referring MOB_NBR-ADV message. |
| } | | |
| For(j=0;j< N_New_BS_Index;j++){ | | |
| Neighbor_BS_Index | 8 bit | |
| ..... | | |

| Syntax | Size (bits) | Notes |
|---|---|---|
| MOB_BSHO-RSP_Message_format() { | — | — |
| Management Message Type = 58 | 8 | — |
| Mode | 3 | 0b000: HO request<br>0b001: MDHO/FBSS request: Anchor BS update with CID update<br>0b010: MDHO/FBSS request: Anchor BS update without CID update<br>0b011: MDHO/FBSS request: Diversity Set update with CID update<br>0b100: MDHO/FBSS request: Diversity Set update without CID update<br>0b101: MDHO/FBSS request: Diversity Set update with CID update for newly added BS<br>0b110:: MDHO/FBSS request: Diversity Set update with CID update and CQICH allocation for newly added BS<br>0b111: MS handover request not recommended (BS in list unavailable) |

| } | — | — |
|---|---|---|
| Action time | 8 bits | — |
| padding | variable | Padding bits to ensure byte aligned. |
| TLV encoded information | 3 bits | TLV specific See 11.16.1. |
| } | | |

Figure 15

METHOD AND SYSTEM FOR HANDOVER NEGOTIATION OPTIMIZATION FOR WIRELESS SYSTEM

CROSS-REFERENCES TO RELATED APPLICATIONS

This application claims priority to U.S. Provisional Application No. 60/698,692, filed Jul. 12, 2005, which is incorporated by reference herein.

Additionally, this application is related to U.S. patent application Ser. No. 11/384,039, in the name of Zhixian Xiang, titled, "Method and System for Mobile Station Handovers with Different Priorities in Wireless Networks," filed Mar. 17, 2006, incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a method and system for handover negotiation in wireless networks. Merely by way of example, the invention is described as it applies to base-station or mobile-station initiated handovers, but it should be recognized that the invention has a broader range of applicability.

Techniques for wireless communications have progressed through the years. A wireless network usually includes base stations and mobile stations. For example, a mobile station (MS) refers to a station that is to be used while in motion or during halts at unspecified geographic locations. As an example, the mobile station is a mobile communication device. In another example, the mobile station is a cellular phone. In yet another example, a base station (BS) refers to a set of equipment that can provide connectivity, management, and control for one or more mobile stations. Often, a mobile station communicates with other devices through an air-interface provided by a base station. For example, the air-interface refers to an interface between the base station and the mobile station. Usually, the air-interface can be changes through a process called mobile station handover (HO). During handover, the mobile station, for example, can migrate from an air-interface provided by one base station to another air-interface provided by another base station. The mobile station handover can be initiated by either the mobile station or the base station for various reasons such as mobile-station movement, change in connection quality, and/or change in network configuration.

FIG. 1 shows a simplified conventional wireless network. The network 100 includes base stations 110, 112, and 114, and a mobile station 120. The base stations 110, 112, and 114 each are connected to a wired network 130. For example, the wired network 130 uses internet protocol (IP). The mobile station 120 communicates through an air-interface with the base station 110. The handover of the mobile station 120 can be initiated by the base station 110 or the mobile station 120.

FIGS. 2 and 3 are simplified conventional diagrams for mobile-station handover initiated by base station in wireless network. In the network 100, the base station 110 sends a request message to the mobile station 120 to initiate a handover. The request includes a list of base stations to which the mobile station 120 can be handed over. If the mobile station 120 determines the requested handover to be suitable, the mobile station 120 selects one base station from the list and sends an acknowledgment message back to the base station 110. For example, in the acknowledge message, the mobile station 120 also informs the base station 110 that the base station 112 has been selected. Subsequently, the mobile station 120 is handed over to the base station 112.

FIG. 4 is a simplified conventional diagram for mobile-station handover initiated by mobile station in wireless network. In the network 100, the mobile station 120 sends a request message to the base station 110 to initiate a handover. For example, the response message includes a list of base stations to which the mobile station 120 can be handed over. In response, the base station 110 sends a response message to the mobile station 120. For example, the response message also includes a list of base stations to which the mobile station 120 can be handed over. If the mobile station 120 determines the handover to be suitable, the mobile station 120 selects one base station from the list and sends an acknowledgment message back to the base station 110. For example, in the acknowledgement message, the mobile station 120 also informs the base station 110 that the base station 112 has been selected. Subsequently, the mobile station 120 is handed over to the base station 112.

As shown in FIGS. 2-4, management messages often are exchanged between a mobile station and a base station during a handover process. For example, the management messages include:

1. MOB_BSHO-REQ: This is a request message sent by a base station to a mobile station to initiate a handover.
2. MOB_MSHO-REQ: This is a request message sent by a mobile station to a base station to initiate a handover.
3. MOB_BSHO-RSP: This is a response message sent by a base station to a mobile station to acknowledge receipt of MOB_MSHO-REQ.
4. MOB_HO-IND: This is an acknowledgment message sent by a mobile station to a base station. For example, the acknowledgment message indicates that the mobile station is about to perform a handover, cancel a handover, or reject a handover.

FIGS. 5 and 6 show simplified conventional partial formats for request message and response message for handover respectively. As shown in FIGS. 5 and 6, the request message is called MOB_BSHO-REQ, and the response message is called MOB_BSHO-RSP. For example, the MOB_BSHO-REQ message is sent from the base station 110 to the mobile station 120 for initiating a handover. As another example, the MOB_BSHO-RSP message is sent from the base station 110 to the mobile station 120 to acknowledge receipt of another request message called MOB_MSHO-REQ.

For carrying out a handover successfully, the mobile station and its corresponding base station often have to agree on a handover configuration. For example, the handover configuration includes a list of base stations to which the mobile station can be handed over, and/or an action time. Since a handover usually is initiated by the mobile station or the base station, the initial handover request often is made based on the current information possessed by the initiating entity. The initial request may not satisfy the receiving entity for carrying out the handover. For example, the mobile station is moving, so the information which the base station has used for making a handover request may not reflect the situation when the mobile station receives the handover request. Therefore handover negotiations often are performed.

Hence it is highly desirable to improve techniques for handover negotiations.

BRIEF SUMMARY OF THE INVENTION

The present invention relates in general to telecommunication techniques. More particularly, the invention provides a method and system for handover negotiation in wireless networks. Merely by way of example, the invention is described as it applies to base-station or mobile-station initiated handovers, but it should be recognized that the invention has a broader range of applicability.

According to one embodiment of the present invention, a method for processing a handover request in a wireless network includes sending a first message by a first base station to a mobile station. The first message includes a first handover request. Additionally, the method includes receiving a second message by the first base station from the mobile station. The second message includes a second handover request, and the second handover request includes an indicator indicating whether the second message has been sent from the mobile station in response to a third handover request. Moreover, the method includes processing information associated with the second message by the first base station, and determining whether the second message has been sent from the mobile station in response to the third handover request based on at least information associated with the second message. Also, the method includes if the second message is determined to have been sent from the mobile station in response to the third handover request, sending a third message to the mobile station with respect to the second message. The third message includes a first handover response. The first handover response includes information associated with at least a second base station to which the mobile station is requested to be handed over from the first base station.

According to another embodiment of the present invention, a base station for a wireless network includes one or more components for processing a handover request. The one or more components are configured to send a first message to a mobile station. The first message includes a first handover request. Additionally, the one or more components are further configured to receive a second message from the mobile station. The second message includes a second handover request, and the second handover request includes an indicator indicating whether the second message has been sent from the mobile station in response to a third handover request. Moreover, the one or more components are further configured to process information associated with the second message and determine whether the second message has been sent from the mobile station in response to the third handover request based on at least information associated with the second message. Also, the one or more components are further configured to, if the second message is determined to have been sent from the mobile station in response to the third handover request, send a third message to the mobile station with respect to the second message. The third message includes a handover response. The handover response includes information associated with at least another base station to which the mobile station is requested to be handed over from the base station.

According to yet another embodiment of the present invention, a method for processing a handover request in a wireless network includes receiving a first message by a mobile station from a first base station. The first message includes a first handover request. Additionally, the method includes sending a second message by the mobile station to the first base station. The second message includes a second handover request, and the second handover request includes an indicator indicating the second message has been sent from the mobile station in response to a third handover request. Moreover, the method includes receiving a third message by the mobile station in response to the second message. The third message includes a handover response. The handover response includes information associated with at least a second base station to which the mobile station is requested to be handed over from the first base station.

According to yet another embodiment of the present invention, a mobile station for a wireless network includes one or more components for processing a handover request. The one or more components are configured to receive a first message from a first base station. The first message includes a first handover request. Additionally, the one or more components are configured to send a second message to the first base station. The second message includes a second handover request, and the second handover request includes an indicator indicating the second message has been sent from the mobile station in response to a third handover request. Moreover, the one or more components are further configured to receive a third message in response to the second message. The third message includes a handover response. The handover response includes information associated with at least a second base station to which the mobile station is requested to be handed over from the first base station.

According to yet another embodiment of the present invention, a method for processing a handover request in a wireless network includes sending a first message by a mobile station to a base station. The first message includes a first handover request. Additionally, the method includes receiving a second message by the mobile station from the base station. The second message includes a handover response, and the handover response includes a first indicator indicating whether the base station has rejected the first handover request. Moreover, the method includes processing at least information associated with the first indicator, and determining whether the first handover request has been rejected by the base station based on at least information associated with the first indicator. The first indicator includes an indication variable, and the indication variable is capable of being equal to at least a first value and a second value. If the indication variable equals the first value, the base station has rejected the first handover request.

According to yet another embodiment of the present invention, a mobile station for a wireless network includes one or more components for processing a handover request. The one or more components are configured to send a first message to a base station. The first message includes a first handover request. Additionally, the one or more components are further configured to receive a second message from the base station. The second message includes a handover response, and the handover response includes a first indicator indicating whether the base station has rejected the first handover request. Moreover, the one or more components are further configured to process at least information associated with the first indicator, and determine whether the first handover request has been rejected by the base station based on at least information associated with the first indicator. The first indicator includes an indication variable, and the indication variable is capable of being equal to at least a first value and a second value. If the indication variable equals the first value, the base station has rejected the first handover request.

Many benefits are achieved by way of the present invention over conventional techniques. Some embodiments of the present invention improve the handover process, such as by optimizing the handover negotiation process. Certain embodiments of the present invention provide a request message from a mobile station to a base station, and the request message indicates whether the request message is transmitted in response to another handover request from the base station. For example, such indication can reduce the number of messages that need to be exchanged and can simplify the process of handover negotiation. Some embodiments of the present invention can shorten the process of handover negotiation. Certain embodiments of the present invention can reduce miscommunications during handover negotiation. Some embodiments of the present invention can simplify the process and save bandwidth for a base station to reject a handover request from a mobile station. Certain embodiments of the present invention use rejection mode and rejection reason code in a handover response from a base station responding to a handover request from a mobile station.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIGS. 5 and 6 show simplified conventional partial formats for request message and response message for handover respectively;

FIGS. 13(A) and (B) are simplified diagrams each showing at least parts of a request message for mobile station handover in wireless network according to an embodiment of the present invention;

FIG. 15 is a simplified diagram showing at least parts of a request message for mobile station handover in wireless network according to another embodiment of the present invention.

DETAILED DESCRIPTION OF THE INVENTION

The present invention relates in general to telecommunication techniques. More particularly, the invention provides a method and system for handover negotiation in wireless networks. Merely by way of example, the invention is described as it applies to base-station or mobile-station initiated handovers, but it should be recognized that the invention has a broader range of applicability.

In some conventional handover techniques, a mobile station often receives a handover request or a handover response from a base station and then decides whether to perform the handover based on the conditions at the mobile station. For example, the handover request is a MOB_BSHO-REQ message. In another example, the handover response is a MOB_BSHO-RSP message. If the handover configuration in the handover request or the handover response does not satisfy the mobile station, the mobile station may reject the handover request or the handover response. For example, the handover configuration includes a list of base stations to which the mobile station can be handed over, and/or a security key such as HMAC. In another example, the rejection by the mobile station is made in the form of an acknowledgment message indicating that the mobile station would reject the handover. In yet another example, the acknowledgment message is a MOB_HO-IND message. Often, the conventional acknowledgment message does not indicate any rejection reason and/or any action that the mobile station expects the base station to take. Therefore, upon receiving the acknowledgment message, it is usually difficult for the base station to determine on additional actions. Hence the next handover attempt by the base station often cannot be made effectively.

For example, there are three conventional mechanisms for the base station to re-negotiate the handover after the mobile station rejects the handover request from the base station. The problems associated with these conventional mechanisms are illustrated in FIGS. 7, 8, and 9 respectively.

Figure 1:
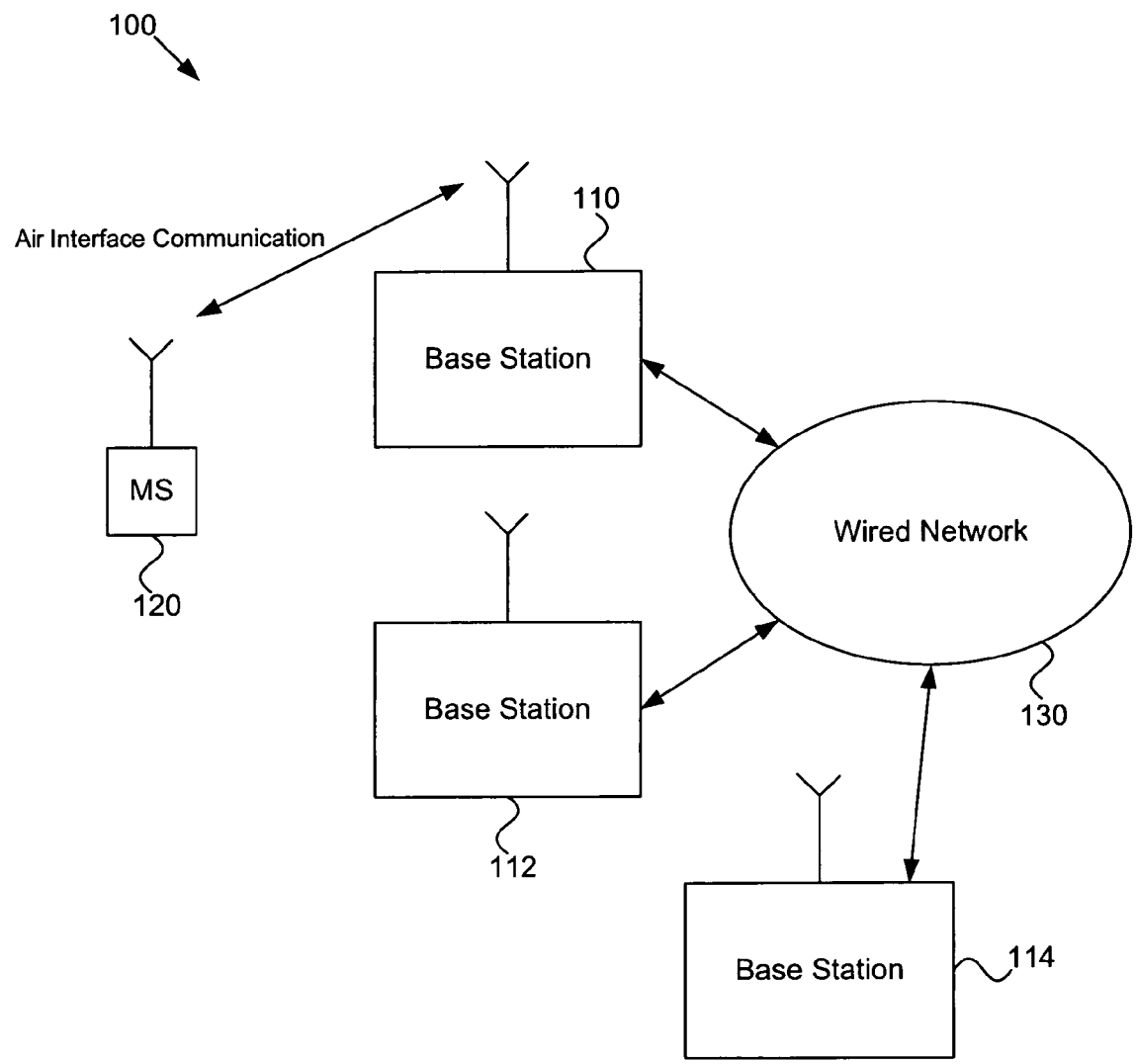
FIG. 1 shows a simplified conventional wireless network.
Figure 2:
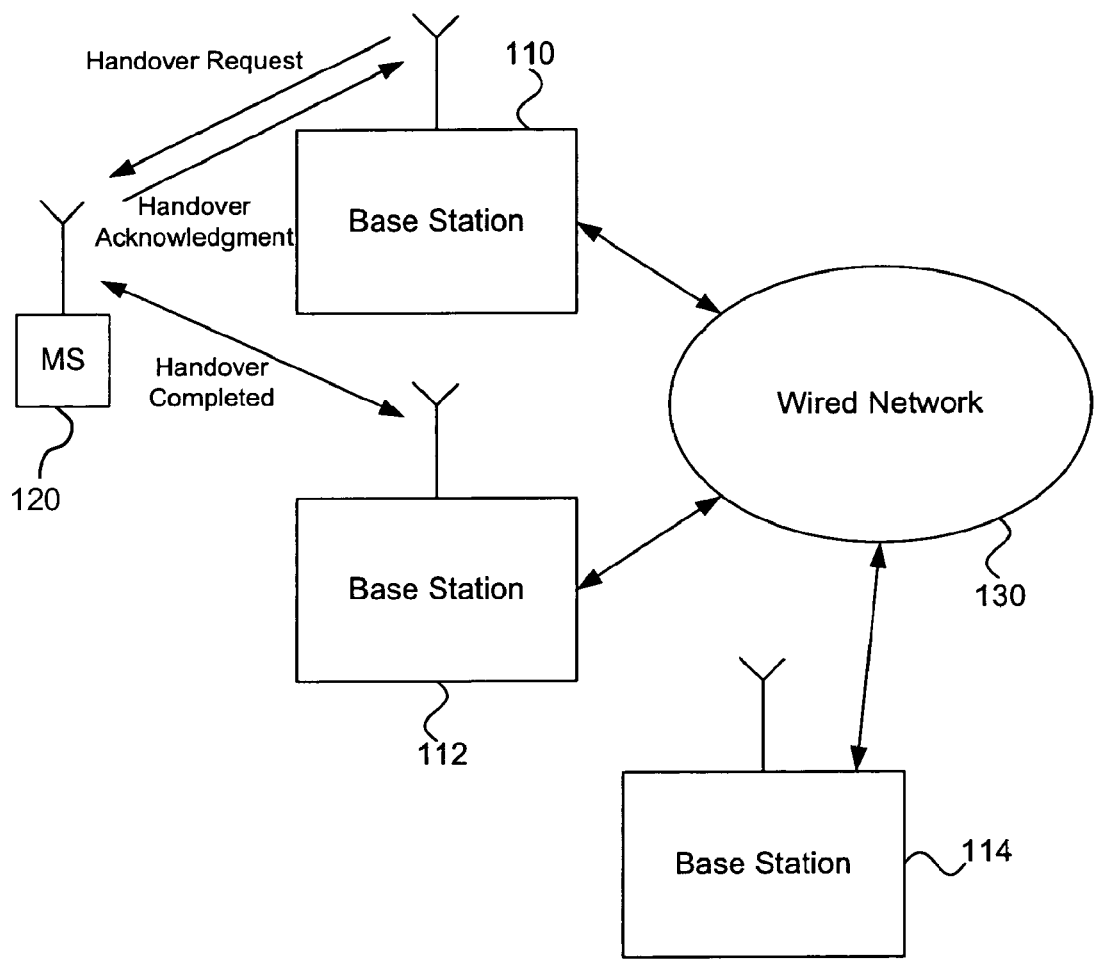
FIGS. 2 and 3 are simplified conventional diagrams for mobile-station handover initiated by base station in wireless network.
Figure 3:
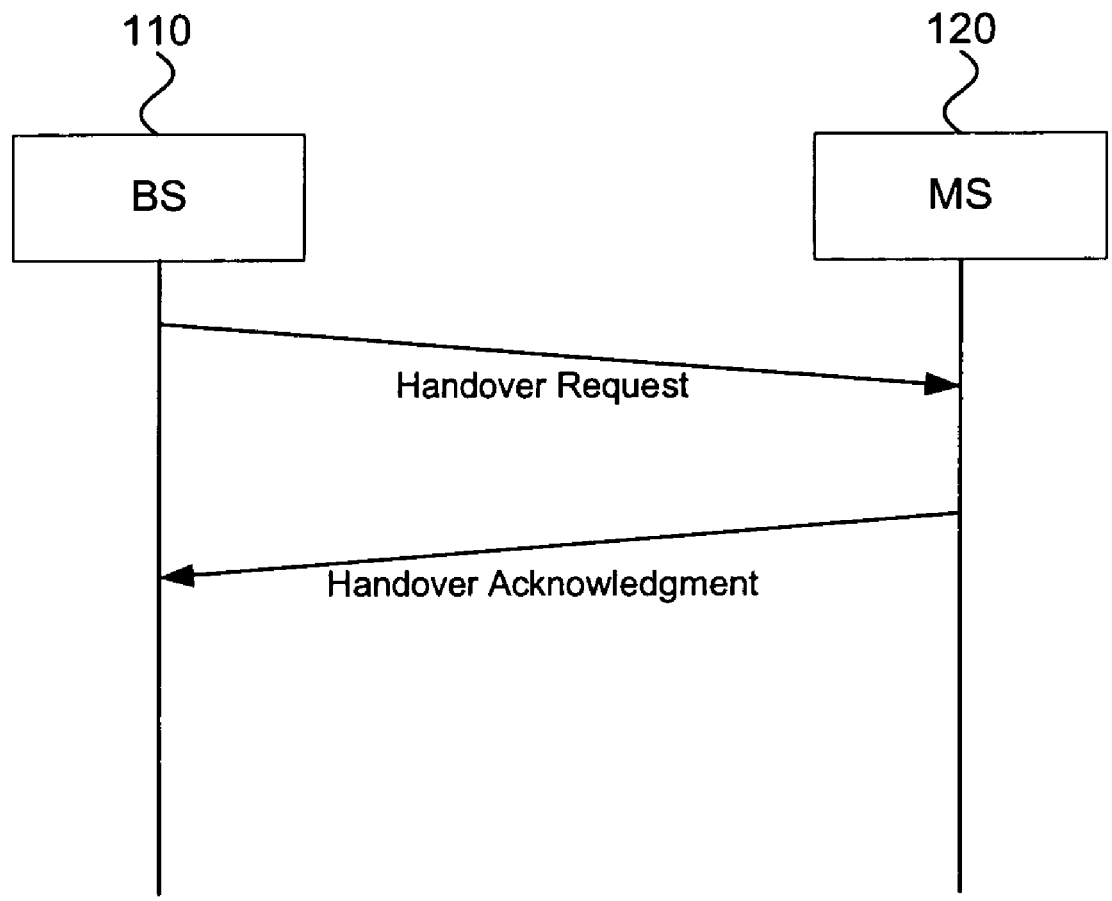
Figure 4:
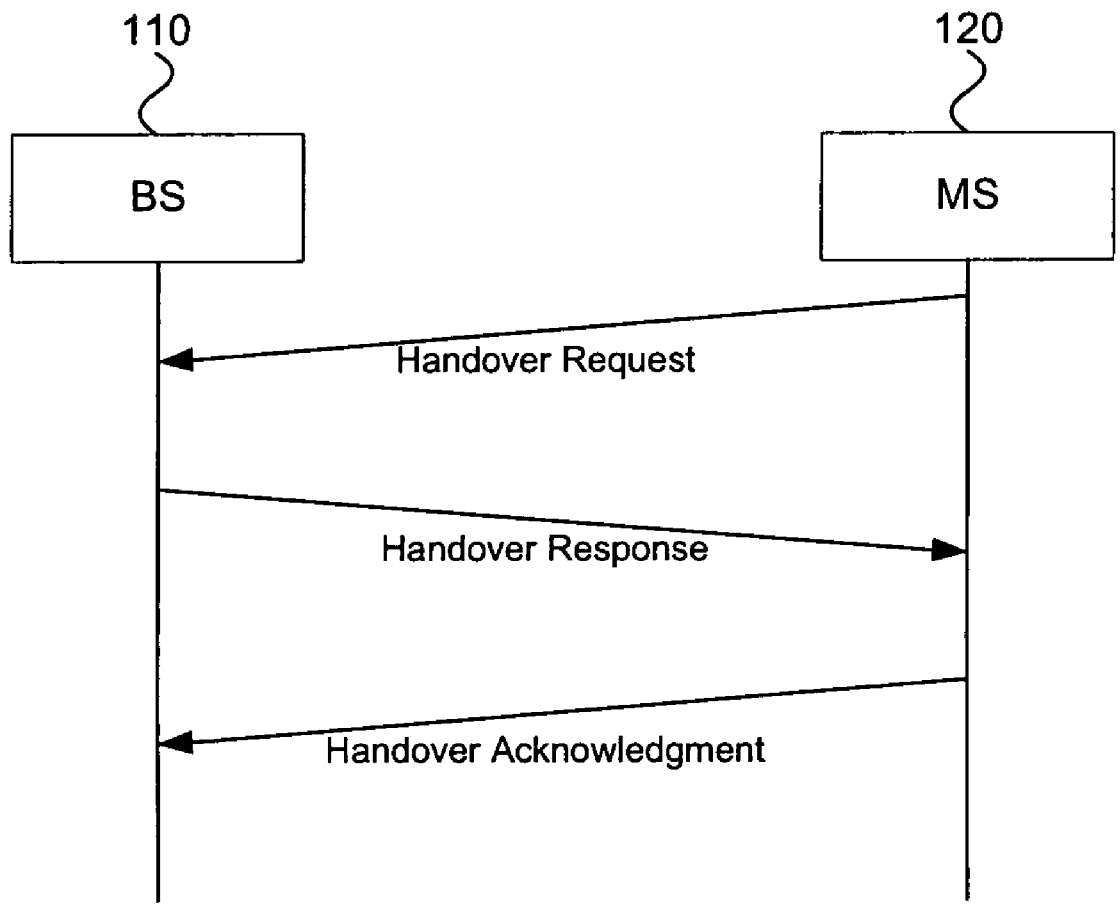
FIG. 4 is a simplified conventional diagram for mobile-station handover initiated by mobile station in wireless network.
Figure 7:
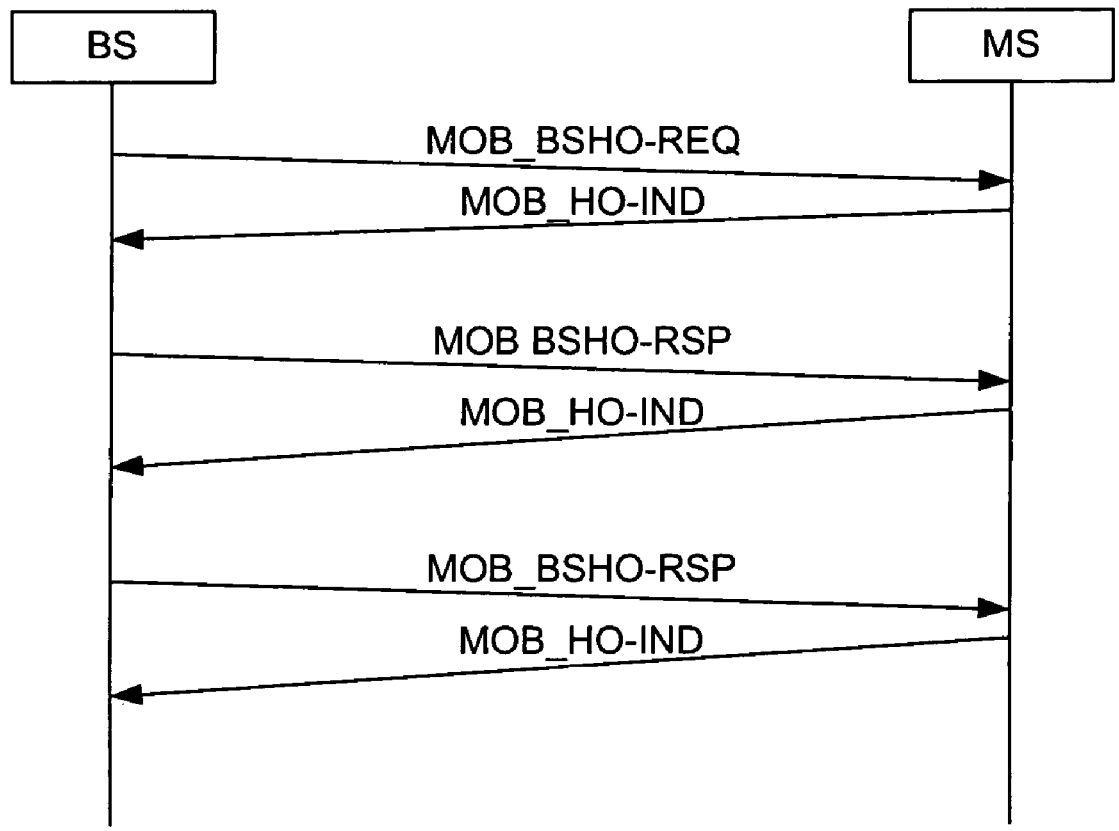
FIG. 7 is a simplified diagram showing lengthy handover negotiation.

FIG. 7 is a simplified diagram showing lengthy handover negotiation. As shown in FIG. 7, the base station receives the rejection to the handover request from the mobile station. In response, the base station reconfigures the list of base stations to which the mobile station can be handed over, and retransmits a handover response including the reconfigured list of base stations. For example, the handover request, the handover rejection, and the handover response are made in the form of MOB_BSHO-REQ, MOB_HO-IND, and MOB_BSHO-RSP respectively. If the previous rejection to the handover is not related to the list of base stations, the mobile station may again reject the handover. So it can take a long time for handover to occur, or the handover may not even occur at all.

Figure 8:
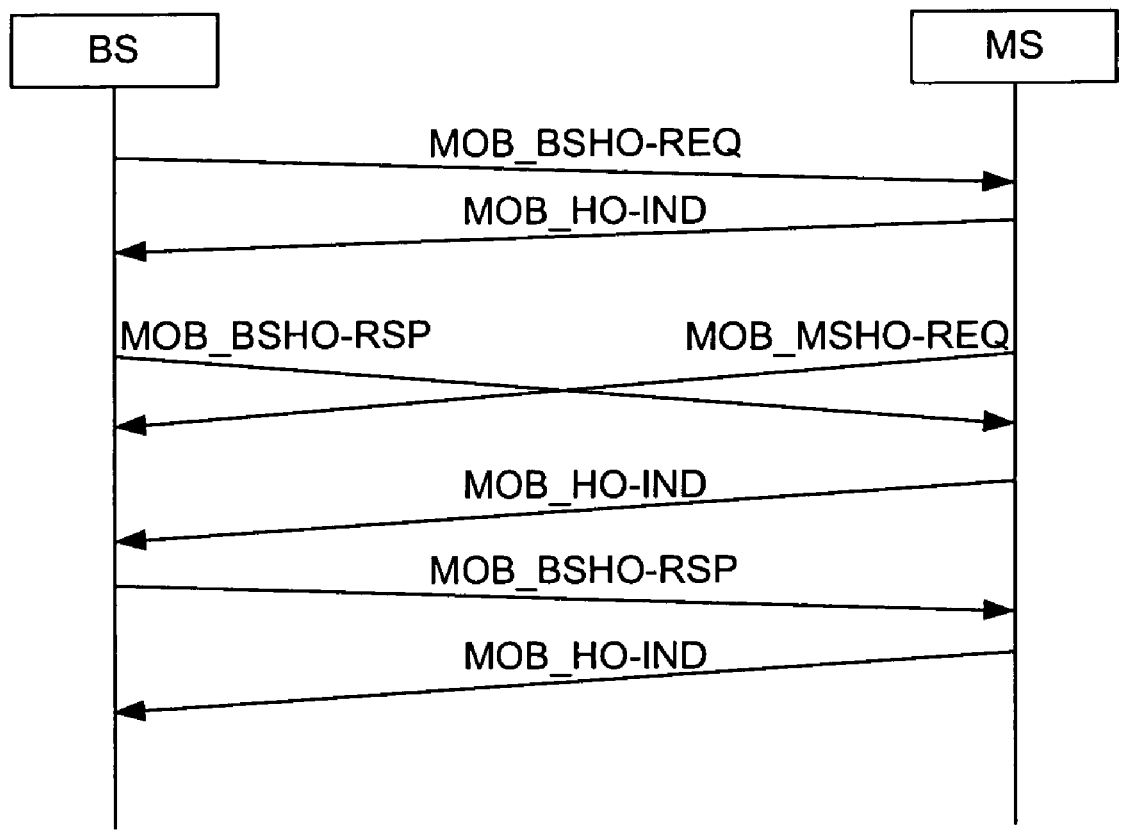
FIG. 8 is a simplified diagram showing unnecessary message exchanges.

FIG. 8 is a simplified diagram showing unnecessary message exchanges. As shown in FIG. 8, the mobile station, after rejecting the handover, sends a handover request with its preferred handover configuration. But since the base station does not know whether it would receive the handover request from the mobile station after the base station receives the handover rejection from the mobile station, the base station sends a handover response to the mobile station before the base station receives the handover request from the mobile station. For example, the handover request from base station, the handover rejection, the handover request from mobile station, and the handover response are made in the form of MOB_BSHO-REQ, MOB_HO-IND, MOB_MSHO-REQ, and MOB_BSHO-RSP respectively. Consequently, the handover response received from the base station may get rejected again by the mobile station. Hence the handover response can complicate the negotiation process, and the resulting message exchanges can also waste the communication bandwidth.

Figure 9:
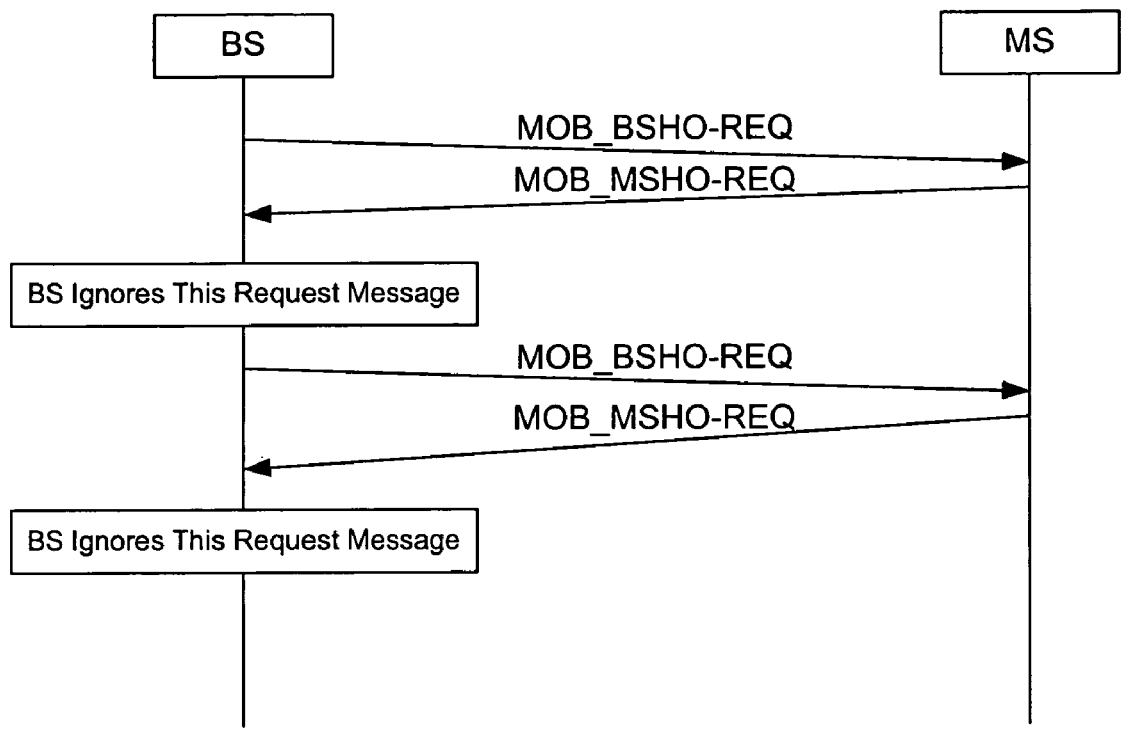
FIG. 9 is a simplified diagram showing miscommunications during handover negotiation.

FIG. 9 is a simplified diagram showing miscommunications during handover negotiation. As shown in FIG. 9, the mobile station sends a handover request in response to the handover request received from the base station. The handover request from the mobile station also is intended to serve as a rejection to the handover request from the base station. For example, the handover request from base station and the handover request from mobile station are made in the form of MOB_BSHO-REQ and MOB_MSHO-REQ respectively. In response, the base station, in order to prevent a race condition, may ignore the handover request from the mobile station because the base station has already sent a handover request to the mobile station. Hence the handover negotiation may fail because of miscommunications between the base station and the mobile station.

Additionally, for a handover initiated by a mobile station, there can be other problems in certain conventional handover techniques. The base station should have the capability to reject the handover request received from the mobile station for various reasons. For example, the rejection is made for lack of alternative base station suitable for mobile station besides the current serving base station. But there is often no rejection mode in certain conventional response messages from the base station. For example, the handover request from mobile station and the handover response from base station are made in the form of MOB_MSHO-REQ and MOB_B-SHO-RSP respectively. In order to indicate the rejection, the base station often has to send a MOB_BSHO-RSP message with a list of zero bas stations to which the mobile station can be handed over. But there are problems associates with this mechanism based on the list of zero base stations.

For example, many fields in the MOB_BSHO-RSP message often are meaningful only when the handover is allowed. If these fields are also included in the MOB_BSHO-RSP message when the handover is rejected based on the list of zero base stations, these message fields can waste the air-interface bandwidth. In another example, after the base station receives the MOB_BSHO-RSP message with the list of zero base stations, the mobile station may not know that the list of zero base stations implies the rejection. Instead, the mobile station may consider the list of zero base stations to be data corruption and hence re-sends the MOB_MSHO-REQ message.

Figure 10:
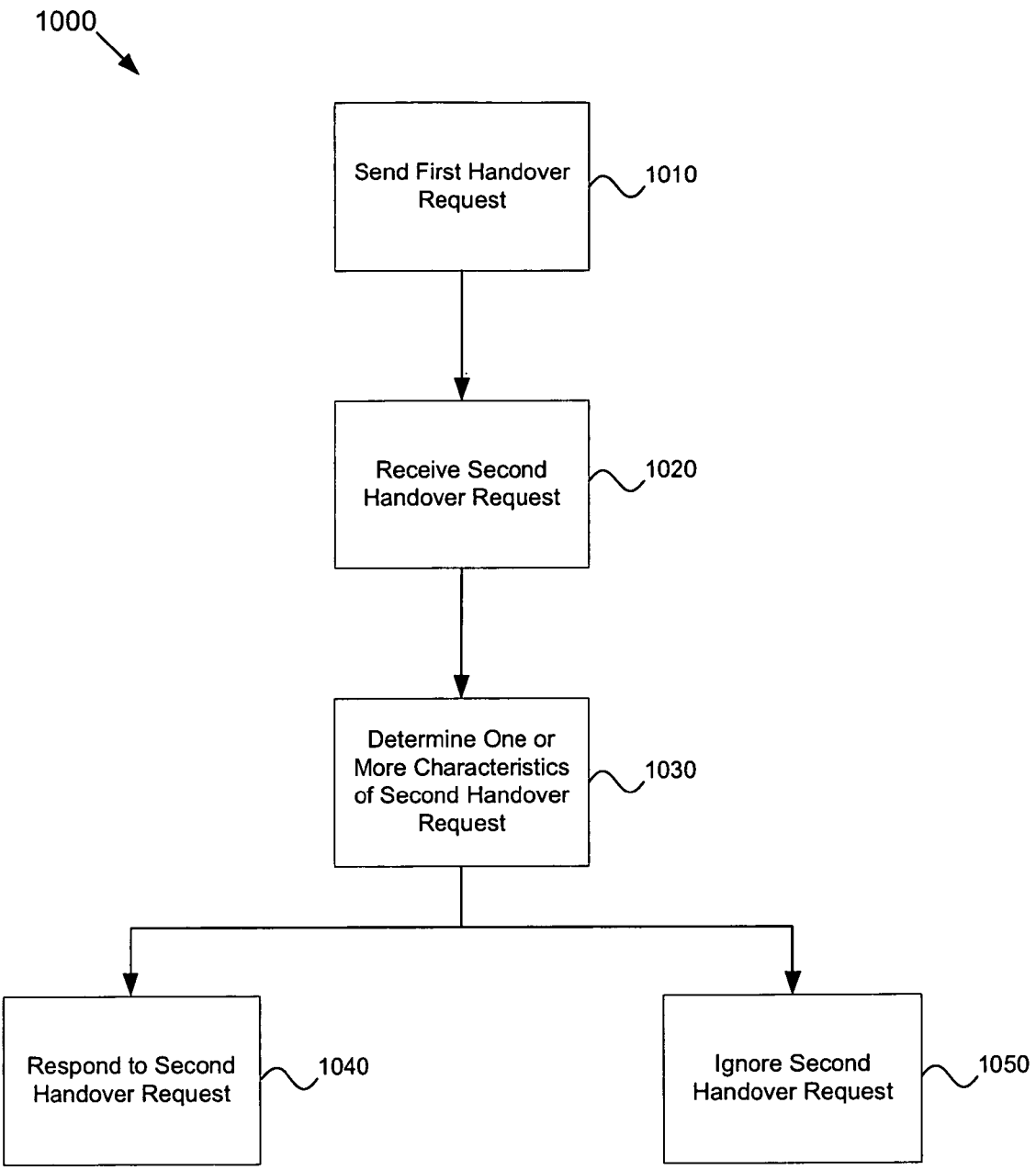
FIG. 10 is a simplified method for mobile station handover in wireless network according to an embodiment of the present invention.

FIG. 10 is a simplified method for mobile station handover in wireless network according to an embodiment of the present invention. This diagram is merely an example, which should not unduly limit the scope of the claims. One of ordinary skill in the art would recognize many variations, alternatives, and modifications. The method 1000 includes process 1010 for sending first handover request, process 1020 for receiving second handover request, process 1030 for determining one or more characteristics of second handover request, process 1040 for responding to second handover request, and process 1050 for ignoring second handover request. Although the above has been shown using a selected group of processes for the method 1000, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method 1000 are performed by one or more computers or one or more processors directed by one or more codes. In another example, some or all processes of the method 1000 are performed according to instructions included by one or more computer-readable media in one or more computer program products. In yet another example, the wireless network is a WiMAX network. Further details of these processes are found throughout the present specification and more particularly below.

At the process 1010, a first handover request is sent from a base station to a mobile station. For example, the base station can communicate with the mobile station through an air-interface provided by the base station. In another example, the first handover request is made through a first request message, which also includes a list of base stations to which the mobile station can be handed over.

At the process 1020, a second handover request is received by the base station from the mobile station. For example, the second handover request is made through a second request message, which includes an indicator. The indicator shows whether the second handover request is made in response to another handover request. For example, the another handover request is the first handover request received by the mobile station. In another example, the second request message includes another list of base stations to which the mobile station can be handed over.

At the process 1030, one or more characteristics of the second handover request are determined by the base station. For example, the base station processes information associated with the indicator of the second request message and determines whether the second handover request is made in response to another handover request. If the second handover request is determined to be made in response to another handover request, the process 1040 is performed. If the second handover request is determined not to be made in response to another handover request, the process 1050 is performed.

At the process 1040, the base station sends a handover response based on information associated with the second handover request. For example, the second handover request includes a handover configuration preferred by the mobile station, and in response, the handover response includes a handover configuration that is different from the handover configuration provided by the first handover request. In another example, the handover response is made through a response message. At the process 1050, the second handover request is ignored by the base station.

As discussed above and further emphasized here, FIG. 10 is merely an example, which should not unduly limit the scope of the claims. For example, following the process 1040, the mobile station receives the handover response. Subsequently, the mobile station sends an acknowledgment message, or a handover request as described for the process 1020. For example, the acknowledgment message indicates that the mobile station accepts the handover requested through the handover response, or rejects the handover requested through the handover response.

Figure 11:
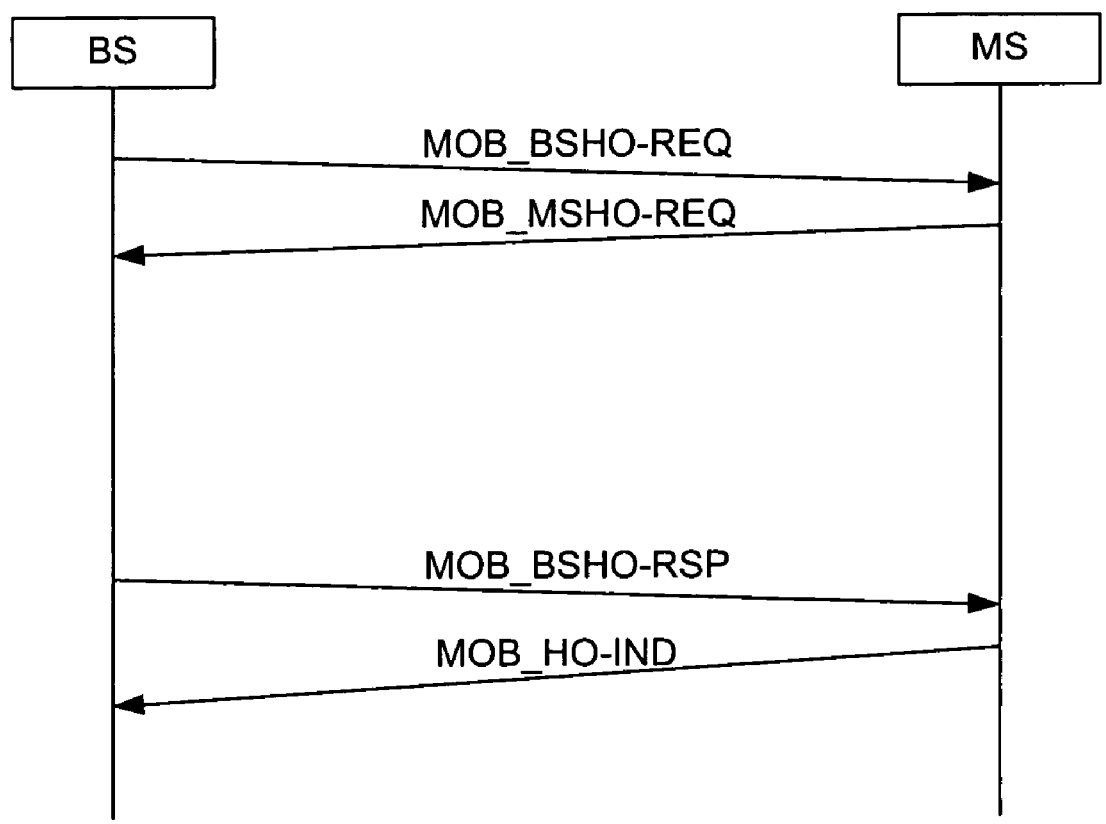
FIG. 11 is a simplified diagram showing an example for method 1000 according to an embodiment of the present invention.

FIG. 11 is a simplified diagram showing an example for method 1000 according to an embodiment of the present invention. This diagram is merely an example, which should not unduly limit the scope of the claims. One of ordinary skill in the art would recognize many variations, alternatives, and modifications. At the process 1010, a base station sends a first handover request to a mobile station through a first request message. For example, the first request message is called MOB_BSHO-REQ. At the process 1020, the base station receives from the mobile station a second handover request through a second request message. For example, the second request message is called MOB_MSHO-REQ. The second request message includes an indicator showing whether the second handover request is made in response to the first handover request. At the process 1030, the base station processes information associated with the indicator and determines that the second handover request is made in response to the first handover request. At the process 1040, the base station sends to the mobile station a handover response based on information associated with the second handover request. For example, the handover response is made through a response message called MOB_BSHO-RSP. The mobile station receives the handover response and sends an acknowledgment message. For example, the acknowledgment message is called MOB_HO-IND. In another example, the acknowledgment message indicates that the mobile station accepts the handover requested by the handover response, or rejects the handover requested by the handover response.

The method 1000 has various applications. For example, following the process 1010, the mobile station receives the first handover request. In response, the mobile station sends an acknowledgment message, or a second handover request. For example, the mobile station sends the second handover request if the mobile station is willing to handover but is not satisfied with the handover configuration provided in the first handover request. In one embodiment, the second handover request is made through a second request message, which includes an indicator. The indicator shows the second handover request is made in response to another handover request, such as the first handover request. In another embodiment, the second handover request is received by the base station as described for the process 1020. In yet another example, the acknowledgment message indicates that the mobile station accepts the first handover request, or rejects the first handover request. If the acknowledgment message indicates the mobile station rejects the first handover request, the base station, upon receiving the acknowledgment message, for example, abandons the first handover request for at least a predetermined period of time.

Figure 12:
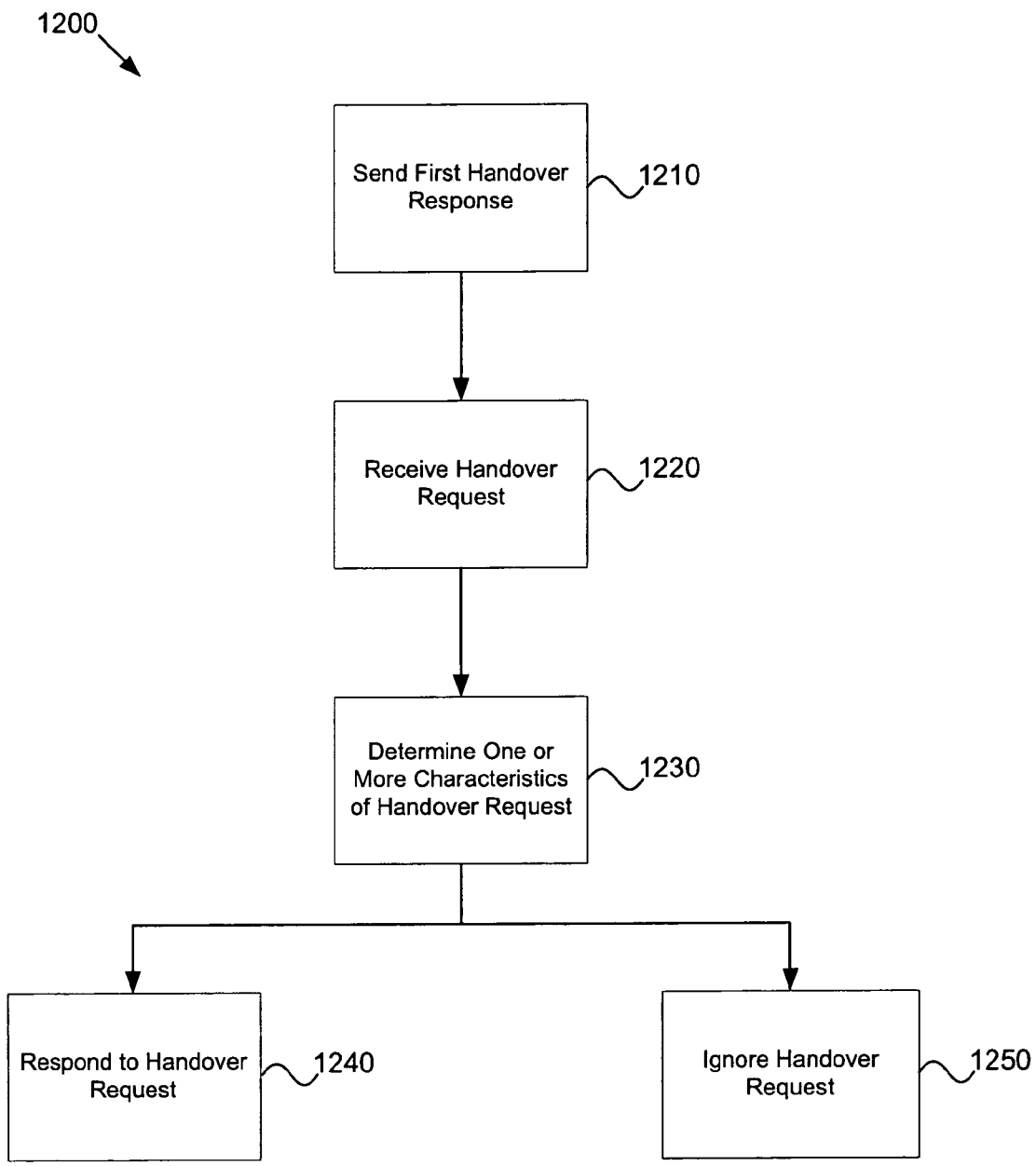
FIG. 12 is a simplified method for mobile station handover in wireless network according to another embodiment of the present invention.

FIG. 12 is a simplified method for mobile station handover in wireless network according to another embodiment of the present invention. This diagram is merely an example, which should not unduly limit the scope of the claims. One of ordinary skill in the art would recognize many variations, alternatives, and modifications. The method 1200 includes process 1210 for sending first handover response, process 1220 for receiving handover request, process 1230 for determining one or more characteristics of handover request, process 1240 for responding to handover request, and process 1250 for ignoring handover request. Although the above has been shown using a selected group of processes for the method 1200, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method 1200 are performed by one or more computers or one or more processors directed by one or more codes. In another example, some or all processes of the method 1200 are performed according to instructions included by one or more computer-readable media in one or more computer program products. In yet another example, the wireless network is a WiMAX network. Further details of these processes are found throughout the present specification and more particularly below.

At the process 1210, a first handover response is sent from a base station to a mobile station. For example, the base station can communicate with the mobile station through an air-interface provided by the base station. In another example, the first handover response is made in response to a handover request received from the mobile station. In another example, the first handover response is made through a first response message, which also includes a list of base stations to which the mobile station can be handed over.

At the process 1220, a handover request is received by the base station from the mobile station. For example, the handover request is made through a request message, which includes an indicator. The indicator shows whether the handover request is made in response to a handover response. For example, the handover response is the first handover response received by the mobile station. In another example, the request message includes another list of base stations to which the mobile station can be handed over.

At the process 1230, one or more characteristics of the handover request are determined by the base station. For example, the base station processes information associated with the indicator of the request message and determines whether the handover request is made in response to a handover response. If the handover request is determined to be made in response to a handover response, the process 1240 is performed. If the handover request is determined not to be made in response to a handover response, the process 1250 is performed.

At the process 1240, the base station sends a second handover response based on information associated with the handover request. For example, the handover request includes a handover configuration preferred by the mobile station, and in response, the second handover response includes a handover configuration that is different from the handover configuration provided by the first handover response. In another example, the second handover response is made through a second response message. At the process 1250, the handover request is ignored by the base station.

As discussed above and further emphasized here, FIG. 12 is merely an example, which should not unduly limit the scope of the claims. For example, following the process 1240, the mobile station receives the second handover response. Subsequently, the mobile station sends an acknowledgment message, or a handover request as described for the process 1020. For example, the acknowledgment message indicates that the mobile station accepts the handover requested through the second handover response, or rejects the handover requested through the second handover response.

According to certain embodiments of the present invention, the method 1000 uses a handover request with an indicator showing whether the handover request is made in response to another handover request. According to some embodiments of the present invention, the method 1200 uses a handover request with an indicator showing whether the handover request is made in response to a handover response.

As an example, FIGS. 13(A) and (B) are simplified diagrams each showing at least parts of a request message for mobile station handover in wireless network according to an embodiment of the present invention. These diagrams are merely examples, which should not unduly limit the scope of the claims. One of ordinary skill in the art would recognize many variations, alternatives, and modifications.

As shown in FIGS. 13(A) and (B), the request message 1300 includes an indication variable called MS HO req operation. For example, the MS HO req operation is used as the indicator for the method 1000 and/or the method 1200. In another example, the MS HO req operation is a 1-bit parameter to indicate whether the handover request is made in response to another handover request and/or a handover response. In yet another example, if the MS HO req operation is equal to 0, the handover request is not made in response to another handover request and/or a handover response. If the MS HO req operation is equal to 1, the handover request is made in response to another handover request and/or a handover response. In yet another example, the request message 1300 is called MOB_MSHO-REQ.

Figure 14:
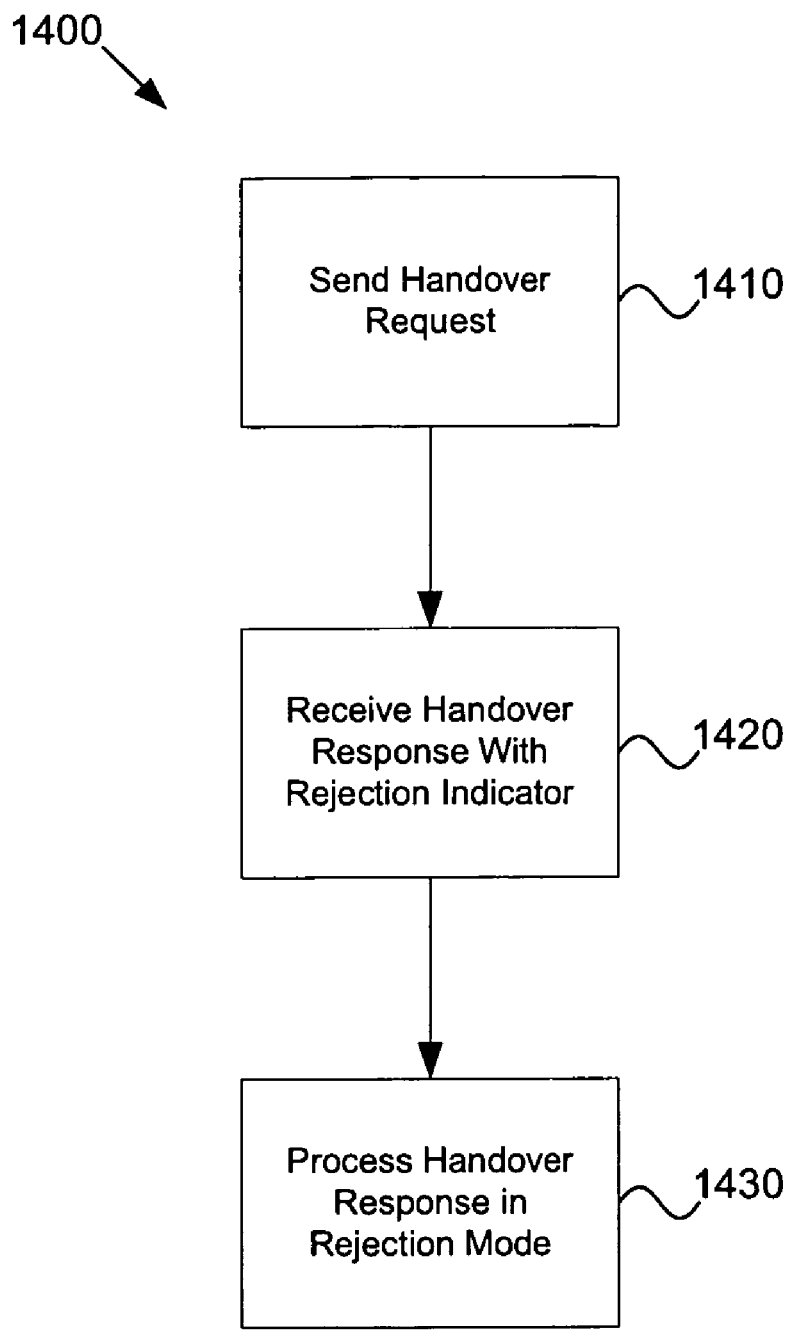
FIG. 14 is a simplified method for mobile station handover in wireless network according to another embodiment of the present invention.

FIG. 14 is a simplified method for mobile station handover in wireless network according to another embodiment of the present invention. This diagram is merely an example, which should not unduly limit the scope of the claims. One of ordinary skill in the art would recognize many variations, alternatives, and modifications. The method 1400 includes process 1410 for sending handover request, process 1420 for receiving handover response with rejection indicator, and process 1430 for processing handover response in rejection mode. Although the above has been shown using a selected group of processes for the method 1400, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method 1400 are performed by one or more computers or one or more processors directed by one or more codes. In another example, some or all processes of the method 1400 are performed according to instructions included by one or more computer-readable media in one or more computer program products. In yet another example, the wireless network is a WiMAX network. Further details of these processes are found throughout the present specification and more particularly below.

At the process 1410, a handover request is received by a base station from a mobile station. For example, the handover request is made through a request message. In another example, the request message includes a list of base stations to which the mobile station can be handed over. For example, the handover request is made through a request message, which includes an indicator as described for the method 1000 and/or the method 1200. The indicator shows whether the handover request is made in response to another handover request. In one embodiment, the indicator shows the handover request is not made in response to another handover request.

At the process 1420, a handover response is received by the mobile station from the base station. For example, the handover response is made through a response message. In one embodiment, the response message includes a rejection indicator. For example, the rejection indictor shows whether the handover request from the mobile station has been rejected by the base station. In another example, the rejection indictor also shows one or more reasons for such rejection. As an example, the one or more rejection reasons are represented by one or more rejection reason codes. In another embodiment, the response message includes a timing indicator. The timing indicator specifies a time period for which the mobile station should wait before responding to the received handover response. For example, the time period equals to zero seconds.

At the process 1430, the handover response is processed by the mobile station. For example, the mobile station processes information associated with the rejection indicator. In one embodiment, the mobile station determines that the handover request from the mobile station has been rejected by the base station based on the rejection indicator. In another embodiment, the mobile station also determines the one or more reasons for such rejection. In another example, the mobile station processes information associated with the timing indicator. In one embodiment, the mobile station determines the time period based on the timing indicator. If the handover request has been rejected by the base station, the mobile station waits for the time period before responding to the received handover response. For example, the mobile station responds to the received handover response by transmitting an acknowledgment message or a request message including a handover request. In one embodiment, the acknowledgment message is called MOB_HO-IND. In another embodiment, the request message is called MOB_MSHO-REQ.

As an example, FIG. 15 is a simplified diagram showing at least parts of a request message for mobile station handover in wireless network according to another embodiment of the present invention. This diagram is merely an example, which should not unduly limit the scope of the claims. One of ordinary skill in the art would recognize many variations, alternatives, and modifications.

As shown in FIG. 15, the request message 1500 includes a variable called Mode. In one embodiment, the Mode variable is used as the rejection indicator for the method 1400. For example, the Mode variable is a 3-bit parameter. If the Mode variable is equal to a binary number of 111, the handover request from the mobile station would have been rejected by the base station. In another embodiment, as shown in FIG. 15, the rejection is shown by 0b111: MS handover request not recommended (BS in list unavailable).

In yet another embodiment, the request message 1500 includes a variable called Action Time. In one embodiment, the Action Time variable is used as the timing indicator for the method 1400. For example, the Action Time variable is a 8-bit parameter. In yet another embodiment, the request message 1500 is called MOB_BSHO-RSP.

According to another embodiment of the present invention, a method for processing a handover request in a wireless network includes sending a first message by a first base station to a mobile station. The first message includes a first handover request. Additionally, the method includes receiving a second message by the first base station from the mobile station. The second message includes a second handover request, and the second handover request includes an indicator indicating whether the second message has been sent from the mobile station in response to a third handover request. Moreover, the method includes processing information associated with the second message by the first base station, and determining whether the second message has been sent from the mobile station in response to the third handover request based on at least information associated with the second message. Also, the method includes if the second message is determined to have been sent from the mobile station in response to the third handover request, sending a third message to the mobile station with respect to the second message. The third message includes a first handover response. The first handover response includes information associated with at least a second base station to which the mobile station is requested to be handed over from the first base station. For example, the method is implemented according to FIG. 10. In another example, the first message includes a handover response, instead of a first handover request, and the method is performed with respect to the handover response according to FIG. 12.

According to yet another embodiment of the present invention, a base station for a wireless network includes one or more components for processing a handover request. The one or more components are configured to send a first message to a mobile station. The first message includes a first handover request. Additionally, the one or more components are further configured to receive a second message from the mobile station. The second message includes a second handover request, and the second handover request includes an indicator indicating whether the second message has been sent from the mobile station in response to a third handover request. Moreover, the one or more components are further configured to process information associated with the second message and determine whether the second message has been sent from the mobile station in response to the third handover request based on at least information associated with the second message. Also, the one or more components are further configured to, if the second message is determined to have been sent from the mobile station in response to the third handover request, send a third message to the mobile station with respect to the second message. The third message includes a handover response. The handover response includes information associated with at least another base station to which the mobile station is requested to be handed over from the base station. For example, the base station can perform according to FIG. 10. In another example, the first message includes a handover response, instead of a first handover request, and the base station processes the handover response according to FIG. 12.

According to yet another embodiment of the present invention, a method for processing a handover request in a wireless network includes receiving a first message by a mobile station from a first base station. The first message includes a first handover request. Additionally, the method includes sending a second message by the mobile station to the first base station. The second message includes a second handover request, and the second handover request includes an indicator indicating the second message has been sent from the mobile station in response to a third handover request. Moreover, the method includes receiving a third message by the mobile station in response to the second message. The third message includes a handover response. The handover response includes information associated with at least a second base station to which the mobile station is requested to be handed over from the first base station. For example, the method is implemented according to FIG. 10. In another example, the first message includes a handover response, instead of a first handover request, and the method is performed with respect to the handover response according to FIG. 12.

According to yet another embodiment of the present invention, a mobile station for a wireless network includes one or more components for processing a handover request. The one or more components are configured to receive a first message from a first base station. The first message includes a first handover request. Additionally, the one or more components are configured to send a second message to the first base station. The second message includes a second handover request, and the second handover request includes an indicator indicating the second message has been sent from the mobile station in response to a third handover request. Moreover, the one or more components are further configured to receive a third message in response to the second message. The third message includes a handover response. The handover response includes information associated with at least a second base station to which the mobile station is requested to be handed over from the first base station. For example, the mobile station can perform according to FIG. 10. In another example, the first message includes a handover response, instead of a first handover request, and the mobile station processes the handover response according to FIG. 12.

According to yet another embodiment of the present invention, a method for processing a handover request in a wireless network includes sending a first message by a mobile station to a base station. The first message includes a first handover request. Additionally, the method includes receiving a second message by the mobile station from the base station. The second message includes a handover response, and the handover response includes a first indicator indicating whether the base station has rejected the first handover request. Moreover, the method includes processing at least information associated with the first indicator, and determining whether the first handover request has been rejected by the base station based on at least information associated with the first indicator. The first indicator includes an indication variable, and the indication variable is capable of being equal to at least a first value and a second value. If the indication variable equals the first value, the base station has rejected the first handover request. For example, the method is implemented according to FIG. 14.

According to yet another embodiment of the present invention, a mobile station for a wireless network includes one or more components for processing a handover request. The one or more components are configured to send a first message to a base station. The first message includes a first handover request. Additionally, the one or more components are further configured to receive a second message from the base station. The second message includes a handover response, and the handover response includes a first indicator indicating whether the base station has rejected the first handover request. Moreover, the one or more components are further configured to process at least information associated with the first indicator, and determine whether the first handover request has been rejected by the base station based on at least information associated with the first indicator. The first indicator includes an indication variable, and the indication variable is capable of being equal to at least a first value and a second value. If the indication variable equals the first value, the base station has rejected the first handover request. For example, the mobile station can perform according to FIG. 14.

As indicated above, this application claims priority to U.S. Provisional Application No. 60/698,692, filed Jul. 12, 2005, which is incorporated by reference herein. Additionally, IEEE Std 802.16e-2005 is also incorporated by reference herein for all purposes.

The present invention has various advantages. Some embodiments of the present invention improve the handover process, such as by optimizing the handover negotiation process. Certain embodiments of the present invention provide a request message from a mobile station to a base station, and the request message indicates whether the request message is transmitted in response to another handover request from the base station. For example, such indication can reduce the number of messages that need to be exchanged and can simplify the process of handover negotiation. Some embodiments of the present invention can shorten the process of handover negotiation. Certain embodiments of the present invention can reduce miscommunications during handover negotiation. Some embodiments of the present invention can simplify the process and save bandwidth for a base station to reject a handover request from a mobile station. Certain embodiments of the present invention use rejection mode and rejection reason code in a handover response from a base station responding to a handover request from a mobile station.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for processing a handover request in a wireless network, the method comprising:
    sending a first message by a first base station to a mobile station, the first message including a first handover request;
    receiving a second message by the first base station from the mobile station, the second message including a second handover request, the second handover request including an indicator indicating whether the second message has been sent from the mobile station in response to a third handover request, wherein the indicator comprises an indication variable, the indication variable capable of being equal to different values, wherein:
        if the indication variable equals a first value, the second message has not been sent from the mobile station in response to the third handover request, and
        if the indication variable equals a second value, the second message has been sent from the mobile station in response to the third handover request;
    processing information associated with the second message by the first base station;
    determining whether the second message has been sent from the mobile station in response to the third handover request based on at least information associated with the second message; and
    if the second message is determined to have been sent from the mobile station in response to the third handover request, sending a third message to the mobile station with respect to the second message, the third message including a first handover response, wherein the first handover response includes information associated with at least a second base station to which the mobile station is requested to be handed over from the first base station.

2. The method of claim 1, and further comprising if the second message is determined not to have been sent from the mobile station in response to the third handover request, sending no handover response to the mobile station with respect to the second message.

3. The method of claim 1 wherein the third handover request and the first handover request are the same.

4. The method of claim 1, and further comprising receiving the third message by the mobile station, the third message including the first handover response.

5. The method of claim 4, and further comprising sending a fourth message by the mobile station to the first base station, the fourth message including a handover acknowledgment.

6. The method of claim 5 wherein the handover acknowledgment indicates whether the mobile station accepts or rejects the first handover response from the first base station.

7. The method of claim 6, and further comprising if the handover request is accepted by the mobile station, performing a handover for the mobile station from the first base station to one of the at least the second base station.

8. The method of claim 4, and further comprising sending a fourth message by the first base station from the mobile station, the fourth message including a fourth handover request, the fourth handover request including an indicator indicating the fourth message has been sent from the mobile station in response to a second handover response.

9. The method of claim 8 wherein the second handover response and the first handover response are the same.

10. A base station for a wireless network, the base station comprising:
    one or more components for processing a handover request, the one or more components configured to: send a first message to a mobile station, the first message including a first handover request;
    receive a second message from the mobile station, the second message including a second handover request, the second handover request including an indicator indicating whether the second message has been sent from the mobile station in response to a third handover request, wherein the indicator comprises an indication variable, the indication variable capable of being equal to different values, wherein:
        if the indication variable equals a first value, the second message has not been sent from the mobile station in response to the third handover request, and
        if the indication variable equals a second value, the second message has been sent from the mobile station in response to the third handover request;
    process information associated with the second message;
    determine whether the second message has been sent from the mobile station in response to the third handover request based on at least information associated with the second message; and
    if the second message is determined to have been sent from the mobile station in response to the third handover request, send a third message to the mobile station with respect to the second message, the third message including a handover response,
    wherein the handover response includes information associated with at least another base station to which the mobile station is requested to be handed over from the base station.

11. The base station of claim 10 wherein the one or more components are further configured to send no handover response to the mobile station with respect to the second message if the second message is determined not to have been sent from the mobile station in response to the third handover request.

12. The base station of claim 10 wherein the third handover request and the first handover request are the same.

13. A method for processing a handover request in a wireless network, the method comprising:
    receiving a first message by a mobile station from a first base station, the first message including a first handover request;
    sending a second message by the mobile station to the first base station, the second message including a second handover request, the second handover request including an indicator indicating the second message has been sent from the mobile station in response to a third handover request, wherein the indicator comprises an indication variable, the indication variable capable of being equal to different values, and wherein:
        if the indication variable equals a first value, the second message has not been sent from the mobile station in response to the third handover request, and
        if the indication variable equals a second value, the second message has been sent from the mobile station in response to the third handover request; and
    receiving a third message by the mobile station in response to the second message, the third message including a handover response, wherein the handover response includes information associated with at least a second base station to which the mobile station is requested to be handed over from the first base station.

14. The method of claim 13 wherein the third handover request and the first handover request are the same.

15. A mobile station for a wireless network, the mobile station comprising:
one or more components for processing a handover request, the one or more components configured to: receive a first message from a first base station, the first message including a first handover request;
send a second message to the first base station, the second message including a second handover request, the second handover request including an indicator indicating the second message has been sent from the mobile station in response to a third handover request, wherein the indicator comprises an indication variable, the indication variable capable of being equal to different values, and wherein:
if the indication variable equals a first value, the second message has not been sent from the mobile station in response to the third handover request, and
if the indication variable equals a second value, the second message has been sent from the mobile station in response to the third handover request;
receive a third message in response to the second message, the third message including a handover response; wherein the handover response includes information associated with at least a second base station to which the mobile station is requested to be handed over from the first base station.

16. The mobile station of claim 15 wherein the third handover request and the first handover request are the same.

17. A method for processing a handover request in a wireless network, the method comprising:
sending a first message by a mobile station to a base station, the first message including a first handover request;
receiving a second message by the mobile station from the base station, the second message including a handover response, the handover response including a first indicator indicating whether the base station has rejected the first handover request, wherein the first indicator further indicates one or more reasons for the base station to have rejected the first handover request;
processing at least information associated with the first indicator; and
determining whether the first handover request has been rejected by the base station based on at least information associated with the first indicator,
wherein:
the first indicator includes an indication variable, the indication variable capable of being equal to at least a first value and a second value, and
if the indication variable equals the first value, the base station has rejected the first handover request, wherein the first handover request includes a second indicator indicating whether the first message is being sent in response to a third handover request.

18. The method of claim 17 wherein the handover response includes a second indicator indicating a time period for which the mobile station should wait before sending to the base station a second handover request if the first handover request has been rejected by the base station.

19. The method of claim 17 wherein the wireless network is a WiMAX network.

20. The method of claim 17, wherein the second indicator comprises an indication variable, wherein if the indication variable equals a first value, the first message is not being sent in response to the third handover request, and wherein if the indication variable equals a second value, the first message is being sent from the mobile station in response to the third handover request.

21. A mobile station for a wireless network, the mobile station comprising:
one or more components for processing a handover request, the one or more components configured to: send a first message to a base station, the first message including a first handover request;
receive a second message from the base station, the second message including a handover response, the handover response including a first indicator indicating whether the base station has rejected the first handover request, wherein the first indicator further indicates one or more reasons for the base station to have rejected the first handover request;
process at least information associated with the first indicator; and
determine whether the first handover request has been rejected by the base station based on at least information associated with the first indicator,
wherein:
the first indicator includes an indication variable, the indication variable capable of being equal to at least a first value and a second value, and
if the indication variable equals the first value, the base station has rejected the first handover request, wherein the first handover request includes a second indicator indicating whether the first message is being sent in response to a third handover request.

22. The mobile station of claim 21 wherein the handover response includes a second indicator indicating a time period for which the mobile station should wait before sending to the base station a second handover request if the first handover request has been rejected by the base station.

23. The mobile station of claim 21 wherein the wireless network is a WiMAX network.

24. The method of claim 21, wherein the second indicator comprises an indication variable, wherein if the indication variable equals a first value, the first message is not being sent in response to the third handover request, and wherein if the indication variable equals a second value, the first message is being sent from the mobile station in response to the third handover request.

* * * * *